United States Patent Office 3,228,189
Patented Jan. 11, 1966

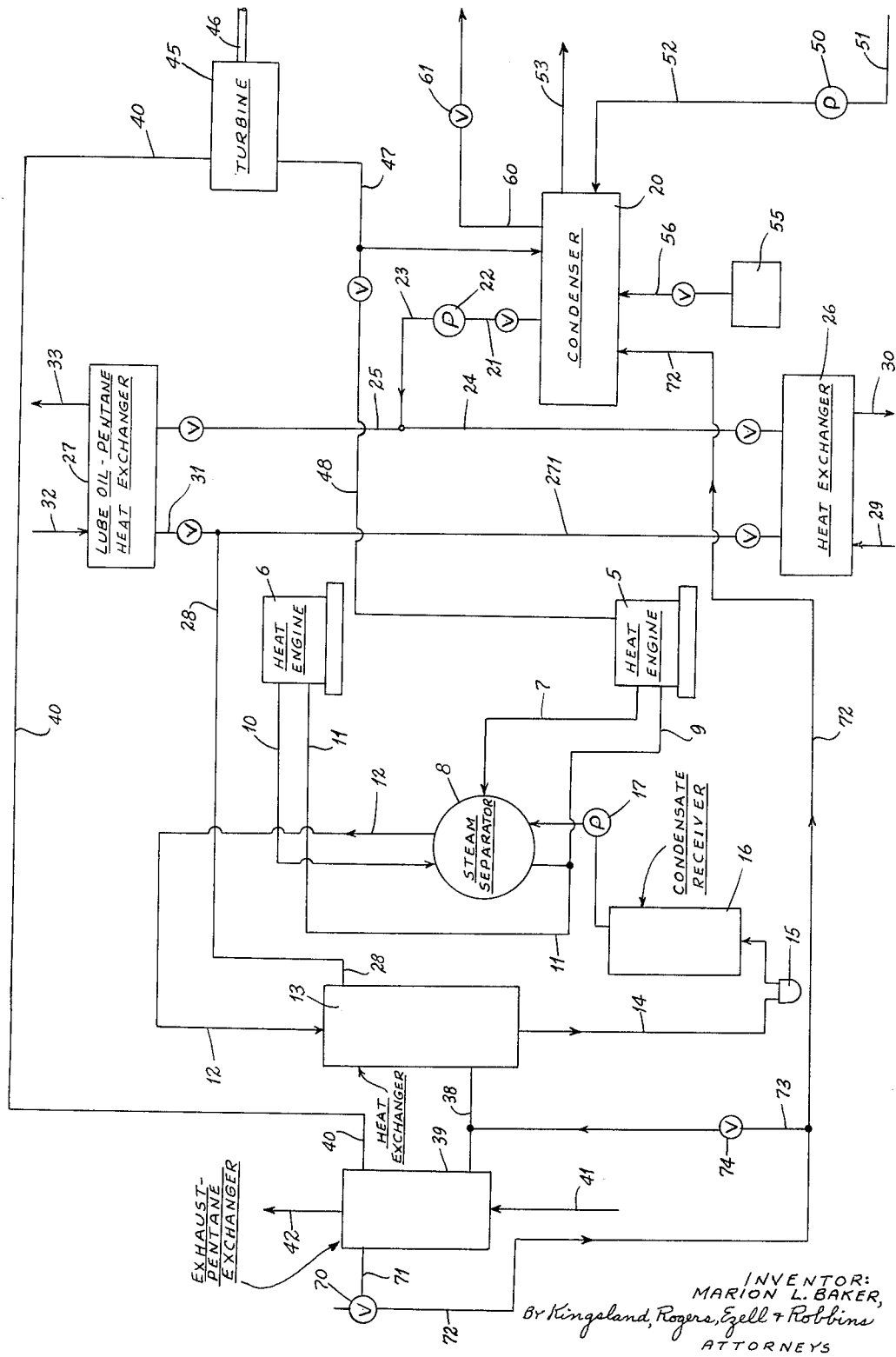

3,228,189
BINARY CYCLE ENGINE HEAT RECOVERY SYSTEM
Marion L. Baker, Glendale, Mo., assignor to Engineering Controls, Inc., St. Louis, Mo., a corporation of California
Filed Dec. 31, 1962, Ser. No. 248,597
9 Claims. (Cl. 60—38)

The present invention relates to an engine heat recovery system such as may be used with internal combustion engines, and specifically one involving a binary cycle, in which heat from the engine is exchanged into a liquid coolant, and from the coolant is exchanged into a separate binary fluid which latter fluid is then employed for useful purposes such as the operation of power equipment or the like, which may or may not be connected with the engine.

In general, the system here involved comprises two separated fluid circuits. There is a coolant fluid circuit having heat exchange means for receiving vaporized coolant and recondensing it, and there is a second circuit that passes the second fluid through the aforesaid heat exchanger to recondense the coolant and to heat the second fluid. The fluid is then passed in heat-exchange relation with exhaust gases from the engine, becoming fully vaporized. Thence it is conducted to an actuated apparatus such as a turbine, by which its energy is used, including a large part of the otherwise waste heat energy of the coolant liquid and exhaust gases. From the actuated apparatus it is condensed and recirculated.

It is a feature of the present system that it can operate at relatively low coolant pressures and yet operate a relatively high-pressure turbine or the like. This it does by employing the binary system, and using a binary fluid such as iso-pentane, the boiling point of which corresponds to that of the coolant liquid when its pressure is raised to a much higher value. By this arrangement, the system can operate a high pressure turbine, which has a much greater efficiency than one operating at the normally-encountered pressures of engine cooling systems. Yet the engine cooling system can be kept at pressures appropriate to such systems, and which provide coolant temperatures most efficient for such engines. Typically the engine coolant is largely water at about two atmospheres and 250° F., while the binary fluid operates the turbine at about 240° F. and 10 atmospheres or 125 p.s.i.g.

It will be evident that features of this invention are useful in other assemblies, but particular utility is found in connection with recovering waste heat from an internal combustion engine and operating a turbine thereby.

Binary systems of the past have used only engine exhaust as a source of heat for vaporizing or otherwise heating the binary fluid. In one instance, represented by Swiss Patent 222,617, published October 16, 1942, a binary system of sorts is disclosed in which the jacket water used for cooling the engine is itself heated by exhaust gases from the engine and then caused to vaporize a liquid petroleum gas, specifically butane, by direct contact therewith. In this instance the engine jacket water apparently would be operated at approximately 13 atmospheres which is far above pressures that are allowable.

The present system has for its object to improve upon such former arrangements by providing an arrangement having a low pressure cooling circuit and a high pressure secondary circuit for operating a high pressure machine. In the Swiss patent, the cooling liquid and binary liquid are mixed together, so that the separate pressure conditions of the present method and apparatus cannot be obtained, and either the coolant pressures are exceptionally high or the turbine pressures are inefficiently low.

It is a further object of the present invention to have a system in which various sources of otherwise wasted heat from an internal combustion engine or the like, including heat obtained in cooling the engines, and heat of exhaust gases, can be recovered and ultimately used for useful purposes such as the production of power.

The drawing represents a schematic flow chart for a system embodying the present invention.

For illustrating the invention, two internal combustion engines are shown at 5 and 6. The cooling liquid from the engine 5 flows out through a pipe 7 to a steam separator 8, and returns therefrom by a pipe 9. The cooling liquid from the engine 6 flows out through a pipe 10 to the separator 8, and returns by a pipe 11. Conventional pumps (not shown) may be used.

The steam from the separator 8 flows out through a pipe 12 to a first heat exchanger 13. It flows through a separated pass of this exchanger, becoming condensed, and passes out through a pipe 14, through a trap 15, and into a receiver 16. A pump 17 directs it from the receiver to the separator 8, whence it can recirculate to the engines.

The binary fluid circuit can start with a condenser 20, connected by a valved pipe line 21 to a pump 22. The outlet 23 of this pump 22 can branch at 24 and 25 into two lubricating oil coolers or equivalent heat exchangers illustrated at 26 and 27, respectively. The line 24 passes through a valve and into the lubricating oil cooler 26. The pentane outlet from the exchanger 26 is valved line 271 that connects into a second pass of the first, or jacket water, heat exchanger by a pipe line 28. The engine oil enters a separate pass of the exchanger 26 by pipe 29, and after being cooled leaves by a pipe 30.

The other valved branch 25 leads into the other lubricating oil heat exchanger 27 having a valved outlet 31 that also connects to the pipe 28. Engine oil enters the exchanger 27 by a pipe 32 and leaves by a pipe 33. The purpose of showing the two lubricating oil coolers separately is to indicate the utility of the present system with a plurality of engines.

The secondary pass of the jacket water heat exchanger 13 discharges by a pipe line 38 that connects into one pass of an exhaust gas heat exchanger 39 that acts as a vaporizer or boiler. This exhaust gas heat exchanger receives the binary fluid from the line 38, passes it in separated but heat exchanger relationship with exhaust gases from the engine, so that it vaporizes. The vapor is discharged through a pipe line 40.

The exhaust line 41 comes from the engine or engines and transmits exhaust gases through the boiler or vaporizer 39, and discharges them by an exhaust line 42.

The binary fluid vapor line 40 delivers vapor under pressure to a turbine 45 thereby converting some of its heat energy into the mechanical energy of rotation of a turbine shaft 46. The exhaust fluid from the turbine 45 is conducted by a pipe line 47 to the condenser 20. Alternately, as desired, the exhaust fluid from the turbine, as well as any escaping or uncondensed gas, can be conducted back to act as fuel for the engine. A valved pipe 48 is shown for this purpose.

While the device has been illustrated in connection with a single turbine, it will be understood that other uses may be made of the binary fluid in its vapor phase. Also a plurality of mechanisms may be connected in parallel or in series.

In order to provide for condensation of the binary fluid in the condenser 20, water or some other cooling medium may be used. For example, water may be pumped in by a pump 50 from a pipe 51 leading from the source of water. The pump delivers the water by a pipe line 52 to the condenser where it moves in heat exchange but separate relationship to the binary fluid, insuring recondensing of the latter. The water may be returned by a discharge pipe 53.

A binary fluid reserve supply tank 55 may be connected through a valved line 56 to the condenser to restore any fluid losses to the system.

Appropriate safety valves and lines may be employed. For example, there is a pressure relief valve 70 connected at 71 into the exhaust boiler to prevent excessive binary fluid pressures therein. The boiler is also connected by a line 72 back into the binary fluid condenser. The line 72 contains a branch 73 connecting through a valve 74 into the outlet of the jacket water condenser.

Another pressure relief line is connected with the condenser 20. It consists of outlet 60 leading to a pressure relief valve 61 that discharges to atmosphere, or that may lead back to the reserve supply tank 55.

Operation

When the engines 5 and 6 are operating, the coolant liquid, which will be assumed to be largely water, is circulated between each of them and the steam evaporator 8, as will be understood. Vapor from the separator 8 flows by the pipe 12 through the exchanger 13, is condensed, and returns to the receiver 16 and the separator 8 for recirculation through the engines. Also exhaust gases will flow through the pipe 41 leading into the boiler 39.

It will be assumed in this explanation that the binary fluid is iso-pentane. An appropriate amount of the fluid is maintained in the system, the amount being replenished as necessary from the storage tank 55. This liquid is circulated from the condenser 20 by the pump 22, into the pipes 23 and its branches 24 and 25. From the two branches the binary fluid passes through the two lubricating oil coolers 26 and 27 where it passes in heat exchange relationship to the lubricating oil for the engines, cools the oil, and is itself somewhat warmed. It is, however, preferably still in a liquid state as it leaves the two lubricating oil coolers by the two lines 271 and 31, that join in the line 28 leading into the other and separate pass of the jacket water condenser 13. In the jacket water condenser the binary fluid passes in heat exchange relationship to the steam or other vapor from the engines. The binary fluid becomes partly vaporized in the jacket water condenser and leaves from the bottom thereof with increased enthalpy. This mixture of liquid and vapor leaves the jacket water condenser through the pipe 38 and enters the exhaust boiler 39 wherein it is all vaporized by heat exchange from the exhaust of the engine introduced in the separate pass of the boiler by the pipe 41 and leaving by the pipe 42.

In this process of vaporization, it is preferable that the temperature and pressure of the binary fluid remain constant, but its enthalpy is greatly increased. It leaves the exhaust boiler by the line 40 as a vapor and is caused to operate the turbine 45. From the turbine it passes again to the condenser 20 where it is condensed again by an appropriate cooling medium. In case of use of this equipment on a boat, the cooling medium can be the water of the stream in which the boat is operating, pumped in by the pump 50 to the condenser by way of the line 52, and discharged by the line 53.

If desired, vapor can be conducted from the turbine (or from any other point where it is uncondensed) to the engine 5 to act as a fuel. The pipe 48 typifies a connection for such purpose. This saves the cost of condensing that vapor. It is useful particularly with dual fuel engines.

With the present system, the separate cooling fluid circuit can operate at a pressure and a temperature appropriate to internal combustion engines. With water as the coolant, a pressure of about 15 p.s.i.g. provides a boiling point of about 250° F. which is satisfactory. By choosing a binary fluid such as iso-pentane, which boils at about 240° F. when its pressure is about 125 p.s.i.g., the binary fluid can condense the coolant vapor in the exchanger 13, and the pressure of the binary fluid can be high enough to obtain an efficient turbine operation.

Typically, then the steam leaving the steam separator 8 by way of the line 12 can be at approximately 15 p.s.i.g. and 250° F. The steam condensate from the outlet of the jacket water condenser 13 can typically be at 200° F.

The iso-pentane leaving the pentane pump 22 can have a typical enthalpy of 34 b.t.u.'s per pound. After leaving the lubricating oil coolers 26 and 27, the iso-pentane, still preferably in a liquid form, can have an enthalpy of 52 B.t.u.'s per pound at 132° F. As it enters the boiler 39, the iso-pentane may be at 240° F. and 125 p.s.i.g. When fully vaporized by the exhaust boiler 39, the iso-pentane leaving therefrom by the pipe line 40 can still be at 125 p.s.i.g. and 240° F. but will have an enthalpy of 226 B.t.u.'s per pound.

For a turbine of 460 H.P. at 3600 r.p.m. typically, the outlet vapor at 100° F. and 5 p.s.i.g. may have an enthalpy of 180 B.t.u.'s per pound.

The foregoing values are merely intended to be representational of possible values and can illustrate the fact that while the heat of the cooling system for the engines is made use of, nevertheless, the pressure and operating conditions are maintained at reasonably low levels in that circuit. The heat in the exhaust gases is in a very much greater supply than is the jacket water heat. While this great supply of heat is availed of, it is not caused to create difficult and undesirably high pressure and temperature conditions in the cooling liquid, and does not require excessively large volumes of coolant. Furthermore, by using iso-pentant which has a temperature of 240° F. at a pressure of 150 p.s.i.g., a relatively high pressure turbine can be operated.

It will be understood that coolants other than water, and binary fluids other than iso-pentane can be used. Iso-pentane has the advantage that its pressure corresponding to a boiling point of 240° F. is satisfactory for operations such as turbines. Also it poses fewer mechanical problems than such other volatile fluids as the fluorine-compound refrigerants, which are difficult to seal and toxic. However, other volatile binary fluids can be used, to give desired pressures at the boiling temperature of the engine coolant used. It will be understood that the term internal combustion engine shall include, but not be limited to, both piston engines and gas turbine engines for use on any fuel.

Various changes and modifications may be made within the process of this invention as will be readily apparent to those skilled in the art. Such changes and modifications are within the scope and teaching of this invention as defined by the claims appended hereto.

What is claimed is:

1. In a system for recovering waste heat from machines having a liquid coolant and hot exhaust gases; the steps of: cooling the machine with the liquid coolant at relatively low pressure and temperature, and producing some vapor from the coolant; condensing the vapor in separated heat exchange relation with a second fluid in liquid phase, the second fluid, at pressures normally existing in the coolant during operation of the machine, having a boiling point substantially lower than the temperatures normally existing in the coolant during operation of the machine, whereby it would normally vaporize at such temperatures, and said second fluid at the high pressure needed for operation of apparatus as hereinafter set forth, having a raised boiling point at least approximately as high as the temperatures normally existing in the coolant during operation of the machine; maintaining the pressure of the second fluid at said high pressure whereby its boiling point is at said raised value, and hence it continues to be at least in substantial part liquid during condensation of the coolant; returning the condensed liquid coolant to the machine; evaporating the heated second fluid by heat exchange with exhaust gases from the machine, producing vapor at said high pressure; and passing the vaporized second fluid through apparatus and therein withdrawing heat energy from the fluid.

2. The system of claim 1, including the steps of employing a combustible gas for the second fluid, and conducting at least part thereof to the engine to act as a fuel after it has become vaporized.

3. The method of claim 1, including the step of recondensing at least part of the vapor of the second fluid for recirculation and wherein the liquid coolant has a boiling point of about 250° F., and the second fluid has a boiling point approximately the same but at said high pressure, of more than 100 p.s.i.g., whereby high pressure apparatus may be operated by said second fluid.

4. The method of claim 1, wherein the liquid coolant is essentially water, and the second fluid is essentially a liquid hydrocarbon.

5. The method of claim 1, wherein the second fluid is a liquid hydrocarbon.

6. The method of claim 1, wherein the coolant is essentially water at a pressure of not more than about three atmospheres, and the second fluid is a liquid hydrocarbon at such pressure that it has a boiling point no higher than that of the coolant.

7. The method of claim 1, wherein the second fluid is iso-pentane.

8. The method of claim 1, wherein the second fluid is warmed by heat exchange with a lubricant for the machine, and is thereafter, while in a liquid state, transmitted to a heat-exchanger and partially vaporized therein by the step of heat exchange with the coolant; and wherein the final evaporation against the exhaust gases is effected at substantially constant pressure.

9. The method of claim 1, wherein the machines from which the waste heat is recovered comprise at least one internal combustion engine.

References Cited by the Examiner

UNITED STATES PATENTS

| 1,304,298 | 5/1919 | Franco | 60—36 |
| 2,103,902 | 12/1937 | Heintz | 123—196 |
| 2,548,508 | 4/1951 | Wolfner | 123—41.19 X |

FOREIGN PATENTS

| 657,608 | 3/1938 | Germany. |
| 460,466 | 1/1937 | Great Britain. |
| 763,433 | 12/1956 | Great Britain. |

SAMUEL LEVINE, *Primary Examiner.*

ABRAM BLUM, JULIUS E. WEST, *Examiners.*